May 1, 1956     C. J. HAZELTON     2,743,519

CUTTER FOR FACILITATING PEELING OF CITRUS FRUITS

Filed June 17, 1955

INVENTOR.
CHARLES J. HAZELTON
BY
ATTORNEYS

United States Patent Office 2,743,519
Patented May 1, 1956

---

2,743,519

CUTTER FOR FACILITATING PEELING OF CITRUS FRUITS

Charles James Hazelton, Tulsa, Okla.

Application June 17, 1955, Serial No. 516,205

5 Claims. (Cl. 30—24)

The present invention relates to a cutter for facilitating the peeling of citrus fruit, such as oranges, grapefruit, and the like.

An important object is to provide a fruit knife with a curved sharp cutting blade for easily cutting the skin, peel, or rind of an orange or grapefruit without damaging or cutting the meat or wasting the juice.

A further object comprehends the provision of a fruit knife having a handle provided at one end with a round cutting head which has a curved sharp blade extending outwardly and medially therefrom and which extends from one side of the handle to the opposite side thereof. The width of the cutting blade on one side is greater than that on the opposite side of the handle so as to readily adapt the blade for cutting the skins of citrus fruit having different skin thicknesses.

A still further object consists in forming the ends of the curved cutting blade on opposite sides of the handle, with transversely curved terminal portions which extend inwardly toward the handle, so as to provide a sharp pointed hook for initially inserting the blade into the fruit. Additionally, the curved head is of such a width and shape as to provide means for controlling the depth of cut of the blade into the fruit, so as to prevent the cutting edge of the blade from piercing the fruit too deeply.

Other objects and advantages of the invention will become apparent from the following description when taken in conjunction with the accompanying claims and drawings.

Referring to the drawings.

Figure 2:
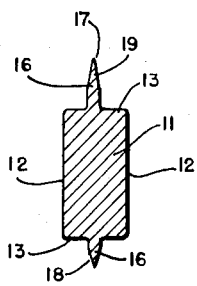
Figure 2 is a sectional view taken substantially along the line 2—2 of Figure 1.

Referring to the drawings, 10 indicates the handle of the fruit cutter or knife which may be of any suitable length and configuration, so as to facilitate the manipulation of the same. The handle 10 at one end is formed with an enlarged round cutting head 11 having opposed flat sides 12 (Fig. 2) and a relatively wide convexed base or periphery 13 which merges into a reduced intermediate portion 14 of the handle, as at 15, on opposite sides of the cutter.

Extending outwardly and laterally from the head 11 and substantially centrally thereof is a curved blade 16 having a sharp pointed cutting edge 17 which extends from one side of the handle 10 to the opposite side thereof. The blade 16 is circumferentially tapered so as to be of less width on one side of the handle, as at 18, than on the opposite side 19 (Fig. 2), in order that the knife may with equal efficiency be used for cutting the skins of citrus fruit of different thicknesses at a minimum expenditure of time and effort, so that the skin or rind may then easily be manually or otherwise removed from the fruit. The ends of the cutting blades 16, each terminates in a curved transverse terminal portion 20 provided with an inwardly disposed hook or point 21 for initially being inserted into the fruit for starting the cutting operation.

Figure 3:
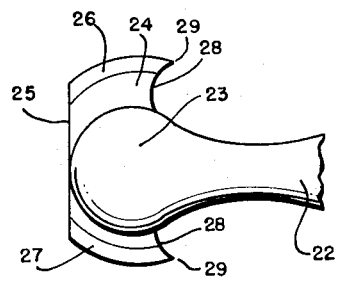
Figure 3 is a detailed side view of a modified form of the invention.

In the modification shown in Figure 3, the handle 22 is connected to a round cutting head 23 which is substantially similar in construction to the head 11, previously described. However, the curved tapered blade 24 instead of being formed in one continuous piece, may be provided with an intermediate cut-off or interrupted straight portion 25, so as to form a sharp cutting blade edge section 26 on one side of the handle and a correspondingly sharp cutting blade edge section 27 of different width than the blade edge section 26 and on the opposite side thereof. The inner ends of the sectional blade 24 are transversely curved, as at 28, and each is formed with the pointed inwardly extending hook 29. As shown, the cutting edge section 26 of the blade 24 is of greater width than the cutting edge section 27, so that the knife may be sufficiently used for cutting the rinds or skins of citrus fruit of various thicknesses, so that they may be subsequently removed from the fruit.

Figure 1:
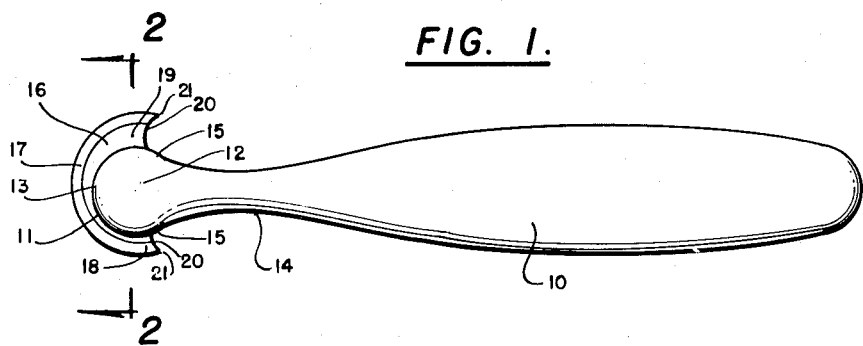
Figure 1 is a side view of a fruit peeler or knife constructed in accordance with the present invention.

In use the orange or grapefruit is held in one hand and the peeler or knife 10 (Fig. 1) in the other hand. Assuming the skin or rind of the fruit is thin, then the hook or pointed end 21 on the narrow side 18 of the blade is inserted into the fruit usually at the top or stem end, and the fruit rotated. At the same time, the knife is manually moved around the circumference or outer periphery of the fruit, so as to cut the peel or skin in an entire circle in the same manner as if the fruit were being cut in half by a knife. After this severing operation, the fruit is turned 90° in the hand and the same procedure repeated starting and ending the circle at the same point usually at the stem end. The rind or skin of the fruit is now quartered so that it may be easily removed from the fruit. Preferably, the rind is cut or sectioned into sixteen parts. In other words, the orange or grapefruit is circled four times with the knife and this may be done at a minimum expenditure of time due to the simplicity of operation of the device. The operation of the knife shown in Figure 3 is similar to that shown in Figure 1.

Thus, it will be seen that a fruit knife is provided in which the fruit, such as oranges, grapefruit, or the like can be sectioned quickly and the skin then removed without cutting or damaging the meat or fruit itself, and which cuts into the fruit only very slightly so as not to waste much of the fruit juice. Moreover, the different widths of the blades on opposite sides of the handle provide means for using the knife with fruit having skins of different thicknesses. The flat curve base 13, from which the blade 16 extends, constitutes on opposite sides of the blade, a stop shoulder which prevents the cutting edge 17 of the blade from piercing the fruit too deeply either when cutting a fruit with a thick or thin skin.

Figure 4:
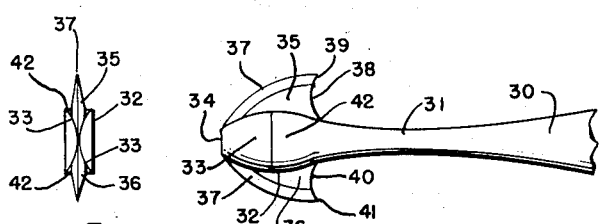
Figure 4 is a side view of a modified form of cutter.
Figures 5, 6:
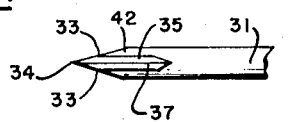
Figure 5 is an end view of Figure 4.
Figure 6 is a detailed plan view of Figure 4.

In the modified form of the invention shown in Figures 4, 5, and 6, the handle 30 of the cutter has a reduced intermediate portion 31 which terminates in an enlarged cutting head 32 provided with oppositely disposed tapered sides 33 (Fig. 6) which converge outwardly and are connected to a transverse centrally disposed straight edge 34. Between the tapered sides 33 and on opposite sides of the head 32 are curved outwardly and laterally extending blades 35 and 36 which taper outwardly so as to merge with the head 32 on opposite sides of the transverse straight edge 34 (Fig. 4). Each of the blades 35 and 36 has a curved cutting edge 37 which at one end merges into the adjacent end of the transverse blade 34. The opposite or inner end of the blade 35 has a transverse curved portion 38 which forms with the edge 37 a hook or point 39. Similarly, the blade 36 has a transverse curved inner end portion 40 which coacts with the cutting edge 37 thereof to form a hook or point 41. The transverse portion 38 of the blade 35 is wider than the portion 40 of the blade 36 so that the blade 36 is of less width than the blade 35 in order to facilitate the cutting of rinds or peels of citrus fruit of different thicknesses. Thus, it will be seen that the knife 30 can be efficiently used for cutting the skin, peel or rind of an orange or grapefruit without cutting deeply into the meat. Additionally, the transverse straight edge 34 provides easy and convenient means for digging out stems from the fruit, prying free any rind which might be difficult to remove, and removing the membrane which has a tendency to adhere to the meat of grapefruit. The head 32 in the rear of the tapered sides 33 and on opposite sides of blades 35 and 36 has a base portion 42 which constitutes stop means for limiting the inward penetration of the blades into the citrus fruit so as to allow the cutter to be used for cutting or sectioning citrus fruit of different rind thicknesses.

It will be understood that the forms of the invention shown are merely illustrative of a preferred embodiment and that such changes may be made as come within the scope of the following claims.

I claim:

1. A fruit cutter of the class described including a handle provided with a curved cutting head at one end, said head having a convexed peripheral base merging into the handle at opposite sides thereof, a curved blade extending outwardly and centrally from the base, said blade having end portions of different widths, and said base providing shoulder means disposed on opposite sides of the blade for limiting the inward penetration of the blade into the fruit.

2. A fruit cutter of the class described including a handle provided with a curved cutting head at one end, said head having a flat peripheral base merging into the handle at opposite sides thereof, a curved blade extending outwardly from the base and terminating in transversely curved end portions positioned on opposite sides of the head, each of the said end portions having a hook at the outer edge thereof for penetrating into the skin of a citrus fruit, and said base providing means for limiting the inward penetration of the blade into the fruit.

3. A fruit cutter of the class described including a handle provided with a round cutting head at one end, said head having a convex flat base merging into the handle at opposite sides thereof, a curved blade having a sharp cutting edge extending outwardly and medially from the base and terminating in transverse curved end portions positioned on opposite sides of the head and forming hooks for initially being inserted into the fruit, and the ends of the blade each having a transversely and downwardly curved terminal portion merging into the blade to provide a sharp point for initially penetrating the skin of the fruit.

4. A fruit cutter of the class described including a handle provided with a round cutting head at one end, said head having a convex flat base merging into the handle at opposite sides thereof, a curved blade having a sharp cutting edge extending outwardly and medially from the base and terminating in transverse curved end portions positioned on opposite sides of the head and forming hooks for initially being inserted into the fruit, one of said end portions being of greater width than the other so that the peeler may be used for cutting fruit having skins of different thicknesses, and the ends of the blade each having a transversely and downwardly curved terminal portion merging into the blade to provide a sharp point for initially penetrating the skin of the fruit.

5. A fruit cutter of the class described including a handle provided with a round cutting head at one end, said head having a convex flat base merging into the handle at opposite sides thereof, a curved blade having a sharp cutting edge extending outwardly and medially from the base and terminating in transverse curved end portions positioned on opposite sides of the head and forming hooks for initially being inserted into the fruit, one of said end portions being of greater width than the other so that the peeler may be used for cutting fruit having skins of different thicknesses, and the ends of the blade each having a transversely and downwardly curved terminal portion merging into the blade to provide a sharp point for initially penetrating the skin of the fruit, said base portion constituting a stop shoulder for controlling the depth of cut of the blade into the fruit.

No references cited.